June 18, 1957 — O. B. HARMES — 2,796,160
TORQUE CLUTCH
Filed May 28, 1952

INVENTOR
OREN B. HARMES
BY Williamson, Williamson, Schroeder, Adams
ATTORNEYS

United States Patent Office 2,796,160
Patented June 18, 1957

2,796,160

TORQUE CLUTCH

Oren B. Harmes, Algona, Iowa, assignor to Livingston Tool Co., Algona, Iowa, a partnership Application May 28, 1952, Serial No. 290,547

16 Claims. (Cl. 192—56)

This invention relates to devices for preventing damage to articles to which a torque is being applied by a source of rotary power as a result of the amount of torque being excessive. More particularly, it relates to devices such as clutches interposed between the source of rotary power and the article being rotated and constructed to automatically release when a predetermined torque is exceeded.

Many modern manufacturing and assembling operations require the application of a limited torque to various items. For most of these items there is an optimum torque above which damage will result and below which the resulting product or item is of an inferior grade. For example, radiator tubes are expanded while positioned within the header plates through which they extend in order to secure these tubes to these header plates. When the tubes are expanded to exactly the optimum extent, the header plates will hold the tubes firmly and tightly in place. If the tubes are expanded farther than necessary, the header plates tend to buckle, and of course if the tubes are not expanded sufficiently they will not be held firmly in place by the header plates. Other operations in which assurance that the torque will not exceed a torque of an accurately predetermined amount is highly desirable, are airplane construction and assembly, expanding boiler tubes, etc. Other positions where releasable means for preventing an excessive torque from being applied would be desirable, are between an outboard motor and its propeller, between a washing machine motor and the washer, and between a drill and its tap. In fact, wherever there is danger of injury or rupture to an article being worked upon with a piece of machinery through the use of excessive power, there is a need for mechanism which will automatically and accurately disconnect the power from the work when a predetermined amount of torque is applied. In the case of expansion of boiler tubes, the amount of expansion is controlled by the torque pressure on the mandrel or shank and hence it is imperative that the releasing device release the source of rotary power at an accurate and predetermined torque. My invention is directed toward providing such a means.

It is a general object of my invention to provide a novel and improved automatically releasing means for interpositioning between a source of rotary power and the article to which the power is to be transmitted.

A more specific object is to provide a torque clutch capable of being set to automatically release at an accurate and predetermined torque.

A still more specific object is to provide a torque clutch capable of being set to automatically release at an accurate and predetermined torque and capable of disengaging without danger of subsequently re-engaging and thereby doing serious damage to the article to which the torque is being applied.

Another object is to provide a torque clutch capable of being adjusted to automatically and accurately release at a wide variety of selected torques.

Another object is to provide a torque clutch which will remain capable over a period of extended use of automatically and accurately releasing at selected torques.

Another object is to provide a torque clutch which does not require manual resetting mechanism to return the device to engaging position.

Another object is to provide a torque clutch which when it releases cuts off completely instead of merely slipping and thus entirely eliminates any subsequent drag from creating and transmitting additional torque to the article being worked upon.

Another object is to provide a torque clutch which will repeat perfectly so that the clutch, during successive operations, will each time release at exactly the same torque.

These and other objects and advantages of my invention will more fully appear from the following description made in connection with the accompanying drawings, wherein like reference characters refer to the same or similar parts throughout the several views, and in which.

Figure 1:
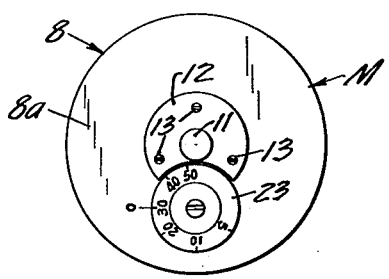
Fig. 1 is a top plan view of one embodiment of my invention.
Figure 2:
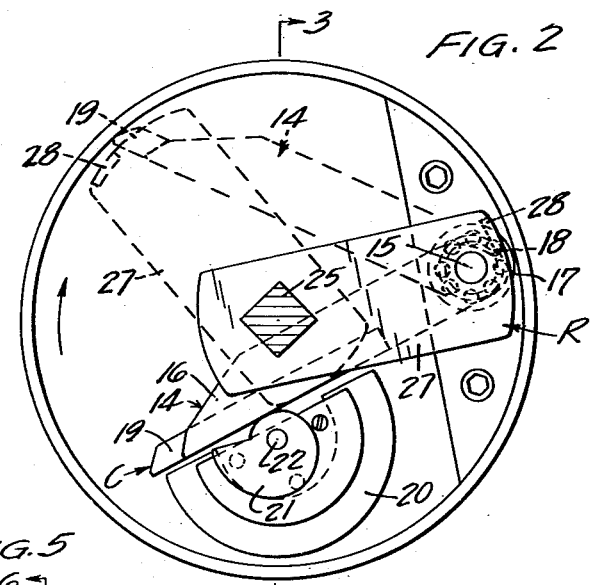
Fig. 2 is a bottom plan view on an enlarged scale with the bottom plate of the housing removed to disclose the interior thereof, this view being taken approximately along line 2—2 of Fig. 3.
Figure 3:
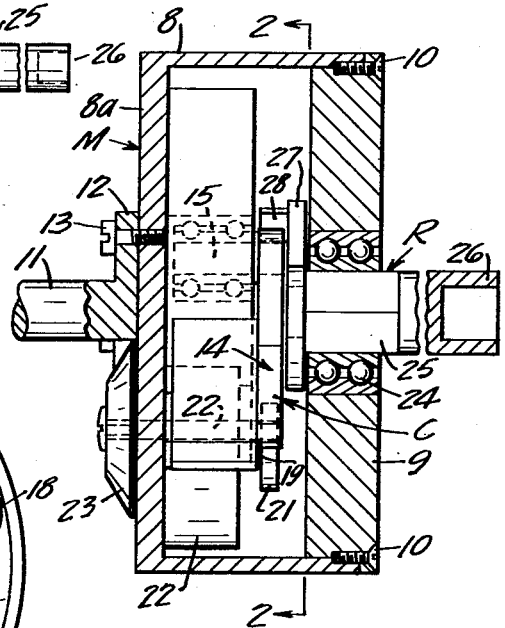
Fig. 3 is a sectional view taken along approximately line 3—3 of Fig. 2.

One embodiment of my invention may include, as shown in Figs. 1–3, a rotary power transmitter mechanism indicated generally as M, a rotor indicated generally as R and connector means indicated generally as C interposed between the transmitter mechanism M and the rotor R to cause the one to rotate with the other. The power transmitter mechanism M as shown includes a generally cylindrical housing 8 made of non-magnetic material such as aluminum and having a removable bottom plate 9 secured thereto by screws 10. This housing 8 is adapted to be connected to a source of rotary power (not shown) by a drive shaft 11 which has an outwardly extending flange 12 at its outer end to connect the shaft to the housing 8 by means of screws 13. Thus the shaft 11 is rigidly fixed to the housing 10 and when connected to the source of rotary power is normally supported thereby.

The connector mechanism C includes a lever member 14 pivotally mounted by its end portion upon a pivot 15 which is pivotally mounted with roller bearings supported by the upper wall 8a of the housing 8 in depending position as best shown in Fig. 3. As a result of being mounted upon the pivot 15 by its end portion, the lever 14 has a longer lever arm 16 which is swingable to the positions shown in Fig. 2, these positions constituting engaging and disengaging positions as hereinafter described. The shorter arm 17 of the lever 14 is swingable to a position adjacent the inner walls or periphery of the housing 8 and its outer end is formed into a dog 18. This dog 18 lies in close proximity to the inner walls of the housing 8 when the lever is in engaging position and extends a substantial distance away therefrom when the lever is in non-engaging position. This may be seen in Fig. 2. The portions of the lever 14 adjacent the pivot post 15 are formed of tool-hardened steel while the free end portions thereof are formed of soft metal. The length of the lever is such that the free end portions extend across the arms of the horse-shoe magnet shown in Figs. 2 and 3 to be hereinafter described. The upper portion 19 of the free end of the lever arm 16 is longer than the lower portion for a purpose to be hereinafter described.

Also included in the connector mechanism C is a permanent magnet 20 of generally horse-shoe shape and formed of a material which will hold its magnetic properties over an extended period. This material may be of the type of material known commercially as Alnico 5. The permanent magnet 20 is fixedly secured to the upper wall 8a of the housing 8 in a position such that when the lever 14 is swung to the solid line position shown in Fig. 2 it will be lying directly across the ends of the magnet in slightly spaced relation but in close proximity thereto.

A cam member 21 is mounted in depending position from the upper wall 8a of the housing 8 so as to extend directly below the opening between the free ends of the horse-shoe magnet 20 and directly opposite the upper portion of the lever 14. This cam member 21 is mounted on a supporting rod 22 which carries an indicator disc 23 at its upper end. As best shown in Fig. 1, the indicator disc carries numerals indicating foot pounds of torque required to move the lever 14 away from the magnet 20 at that position.

The rotor body R is mounted in bearings 24 within the bottom plate 9 of the housing 8 and includes a shaft 25 rotatably carried therewithin. It also includes means for securing the shaft 25 to the article to be rotated, such as a socket 26, and an arm 27 secured to the inner end of the shaft and within the housing. This arm 27 extends laterally of the shaft 25 to a position adjacent the inner walls of the housing 8 as best shown in Fig. 2, and carries an abutment shoulder 28 which extends toward the lever 14. It can be readily seen that the arm 27 and the dog 28 are fixedly secured to the shaft 25 so as to rotate therewith and when such is the case the arm and the dog will describe an arc immediately inward of the inner periphery of the side walls of the housing 8 so that the abutment shoulder 28 will be engaged by the dog 18 of the shorter lever arm 17 when the housing rotates with the drive shaft 11. It should be noted that the shaft 25 extends coaxially of the drive shaft 11 and the housing 8.

Figure 4:
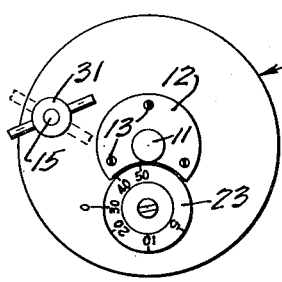
Fig. 4 is a top plan view of a second embodiment of my invention.
Figure 5:
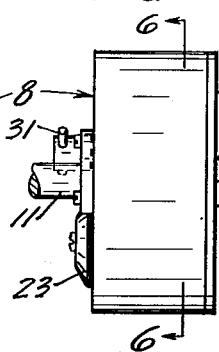
Fig. 5 is a side elevational view of the embodiment shown in Fig. 4.
Figure 6:
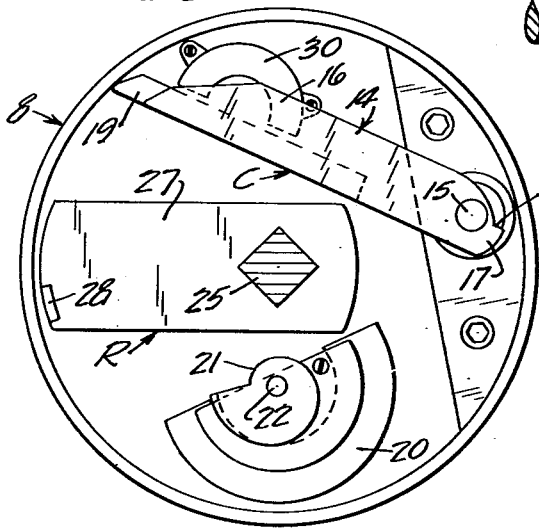
Fig. 6 is a bottom plan view on an enlarged scale of the embodiment shown in Fig. 4 with the bottom plate removed, the view being taken approximately along line 6—6 of Fig. 5.

In the embodiment shown in Figs. 4-6, most of the parts thereof are identical with the structure shown in Figs. 1-3 and accordingly carry corresponding numerals. Added to this structure, however, is a second horse-shoe shaped permanent magnet 30. This magnet is considerably spaced from the magnet 20 and in position to abut against the lever arm 14 when it is swung away from the principal magnet 20. Also added to the structure shown in Figs. 1-3 is a reset arm 31 which is fixedly connected to the pivot post 15 of the lever arm so that when the reset arm is turned manually the lever 14 will be swung therewith.

In operation, the drive shaft 11 is connected to the source of rotary power and this shaft and the housing 8 rotate therewith. As the housing 8 commences its rotation it carries with it the lever 14 and when the dog 18 engages the abutment shoulder 28 it carries the arm 27 therewith, thereby causing the shaft 25 to rotate and to apply a torque to the desired article. When the article to which the torque is being applied furnishes sufficient resistance so that the moment of force produced by the torque and the length of the shorter lever arm 17 exceeds the moment of force produced by the length of the lever arm 16 and the attraction of the permanent magnet 20, the longer lever arm will swing away from the magnet 20 to the broken line position shown in Fig. 2. When this occurs the dog 18 swings away from the inner wall of the housing 8 and out of engaging position relative to the abutment shoulder 28. Thereafter the housing 8 and the magnet 20 and the lever 16 will continue to rotate without engaging the abutment shoulder 28 so that the shaft 25 will cease to turn and thus no further torque is applied to the article being worked upon. The centrifugal fling upon the lever arm 14 is sufficient to hold the same in the dotted line position so long as the housing 8 continues to rotate rapidly. Since the dog 18 swings entirely clear of the abutment shoulder 28 there is a complete cut-off in the relation between these two members and there is no drag tending to continue the rotation of the shaft 25 even though the device has moved to non-engaging position. This is quite contrary to other devices devised for this same purpose.

When the source of rotary power has stopped so that the housing 8 ceases to rotate and hence the centrifugal force on the lever 14 is terminated, the lever arm 14 is acted upon by the magnet 20 and caused to rotate thereby to a position of close proximity to the magnet 20 and simultaneously the dog 18 returns to engaging position relative to the abutment shoulder 28. Thereafter the device is again ready to apply torque for a successive operation. Since the permanent magnet provides a magnetic force which remains the same throughout an extended period of use and since the length of the lever arms 16 and 17 remain the same, the moment of force, in this case torque, remains exactly the same. Thus it can be seen that the device repeats with accuracy. In other words, the lever arm 14 moves to non-engaging position relative to the abutment shoulder 28 each successive time at exactly the same amount of torque. As a result all of the operations are performed with the same amount of torque being applied to the material being worked upon.

In some operations, it is important to back a device connected to the source of rotary power out of the material which is being worked upon. For example, in tapping or in expanding boiler tubes, it is generally necessary to back the tap or the expander out. This can be accomplished with my torque clutch by simply stopping the source of rotary power and thereby permitting the lever arm 14 to return to engaging position and then running the drive shaft in an opposite direction whereupon the abutment shoulder will again engage the dog 18 but on the opposite side to compel the shaft 25 to be driven in the opposite direction. Of course, when driven in this reverse direction, the device will not release at a specific torque value for the parts thereof will be locked relative to each other.

In a case where centrifugal force cannot be used to maintain the lever 14 in disengaging position once it has moved thereto, the embodiment shown in Figs. 4-6 may be used. As described, this embodiment includes a second magnet 30 against which the lever arm 14 will swing when the desired torque is exceeded and thereafter the lever arm will be maintained in disengaged position by this second magnet 30. In order to return the lever arm to engaging position the operator manually turns the reset arm 31 to swing the lever arm 14 back into close proximity with the permanent magnet 20.

It can be readily seen that the amount of torque required to move the lever arm 14 to disengaging position can be varied by spacing the air gap between the free ends of the magnet 20 and the lever arm 14. This spacing can be varied by turning the dial disc 23 so that the cam member 21 will turn therewith and thereby varying the air gap between the lever arm 14 and the free ends of the magnet 20. As best shown in Fig. 1 this disc is calibrated accurately so that it is possible to set the device to automatically release at any desired amount of torque in foot pounds.

One of the most important advantages of my device is its accuracy in the point at which it releases. I have found through testing that a torque clutch constructed in accordance with my invention can be calibrated accurately to release at inch ounces. In fact, the accuracy of the device appears to be limited only in the ability of the user to set the dial at the proper indication. The bearings in which the pivot post 15 is mounted play an important part in this accuracy for it eliminates the frictional effects to a great extent in retarding the movement of the lever arm 14 toward nonengaging position. The use of a soft metal in the free end portions of the lever arm 14 is also important since hardened steel tends to take on magnetic properties and thus would tend to decrease the accuracy of the device. Soft metal, on the other hand, does not tend to take on magnet properties very easily and hence there is little tendency for it to assume magnet properties. The use of a permanent magnet 20 is also important for today it is possible to obtain permanent magnets which will vary very little through a period of extended use.

Another important advantage of my torque clutch is that when it moves to disengaging position there is a complete cut-off of any contact between the source of power and the article being worked upon. In other words, there is no incomplete disconnection between the source of power and the shaft being rotated thereby which might cause damage to the material being worked upon by exceeding the torque desired. Such is often the case when a slip clutch is used but it is impossible for such damage to occur when a clutch manufactured in accordance with my invention is used.

Another advantage of my torque clutch is that it automatically resets itself and does not require manual setting on the part of the operator.

It should be noted that my torque clutch is capable of being adjusted to release over a wide variety of accurate predetermined torques. The cam member 21 increases or decreases the air gap between the lever member 14 and the magnet 20 and thus increases or decreases the effect of the magnetic pull of the magnet upon the lever arm. Thus it is possible with one of my torque clutches to perform one operation at an accurate predetermined torque and quickly and easily reset the clutch so as to perform a subsequent operation at a different and accurate predetermined torque.

Thus it can be seen that I have provided a novel and improved torque clutch of cheap and simple construction and capable of operating with increased efficiency and effectiveness.

It will, of course, be understood that various changes may be made in the form, details, arrangement and proportions of the various parts without departing from the scope of my invention.

What is claimed is:

1. A torque clutch for use in rotating an article, said clutch comprising a rotor adapted to be connected in driving relation to the article to be rotated, rotary power transmitter mechanism adapted to be connected to a source of rotary power, and magnetically held releasable connector means interposed between said mechanism and said rotor and drivably connecting the same to cause the latter to rotate with the former, said connector means including a magnet and a pivotally mounted lever a portion of which is normally held by said magnet in position to complete the driving connection between said mechanism and said rotor, said magnet being positioned to one side of said lever in non-surrounding relation, said portion being automatically releasable by said magnet and movable out of said connection-completing position when a predetermined torque is exerted thereupon whereupon the driving connection between said mechanism and said rotor ceases to exist.

2. A torque clutch for use in rotating an article, said clutch comprising rotary power transmitter mechanism adapted to be connected to a source of rotary power, a first class lever pivotally mounted at its fulcrum on said mechanism and rotating therewith, magnetic means positioned beside in non-surrounding relation and normally holding one end portion of said lever in one extreme position, said end portion of said lever being swingable into widely spaced relation to said magnetic means, and rotatable means connectable in driving relation with the article to be rotated and engaging the other end portion of said lever when the latter is in said position so as to be rotatably driven thereby and disengaging said portion when said lever pivots out of said position, said lever pivoting out of said position when the moment of force exerted upon said second mentioned end portion by said rotatable means exceeds the moment of force exerted by said magnetic means.

3. A torque clutch for use in rotating an article, said clutch comprising a rotor adapted to be connected in driving relation to the article to be rotated, rotary power transmitter mechanism adapted to be connected to a source of rotary power and to rotate therewith, magnetically held releasable connector means interposed between said mechanism and said rotor and drivably connecting the same to cause the latter to rotate with the former, said connector means including a magnet and a pivotally mounted lever extending laterally only of said magnet and at least a part of which is made of a magnetically permeable metal and a portion of which is held by said magnet in position to engage said rotor to create the driving connection between said mechanism and said rotor, said portion being automatically releasable by said magnet and movable out of said position when a predetermined torque is exerted thereupon whereupon said portion disengages said rotor and the driving connection between said mechanism and said rotor ceases to exist, and means for adjusting the air gap between said magnet and said lever to vary the predetermined torque at which said lever will be released by said magnet and said portion will move out of said position.

4. A torque clutch for use in rotating an article, said clutch comprising a rotor adapted to be connected in driving relation to the article to be rotated, rotary power transmitter mechanism adapted to be connected to a source of rotary power, and magnetically held releasable connector means interposed between said mechanism and said rotor and drivably connecting the two to cause the latter to rotate with the former, said connector means including a magnet and a magnetically permeable metal dog positioned laterally of and outside the confines of said magnet and pivotally mounted on said mechanism and normally held in position by said magnet to engage said rotor and to complete the driving connection between said mechanism and said rotor, said dog being automatically releasable by said magnet and movable out of said connecting position when a predetermined torque is exerted thereupon whereupon the driving connection between said mechanism and said rotor will cease to exist.

5. A torque clutch for use in rotating an article, said clutch comprising rotary power transmitter mechanism adapted to be connected to a source of rotary power, a rotor carried by said mechanism in free rotating relation thereto and adapted to be connected in driving relation to the article to be rotated, and magnetically held releasable connector means interposed between said mechanism and said rotor and drivably connecting the same to cause one to rotate with the other, said connector means including a magnet and a pivotally mounted lever at least part of which is of magnetically permeable metal and a portion of which is normally held by said magnet in position to engage said rotor and complete the driving connection between said mechanism and said rotor, said lever extending laterally only of said magnet, said portion being automatically releasable by said magnet and movable out of said connecting position when a predetermined torque is exerted thereupon whereupon the driving connection between said mechanism and said rotor will cease to exist.

6. A torque clutch for use in rotating an article, said clutch comprising a rotary power transmitter mechanism adapted to be connected to a source of rotary power in supported relation and to be rotated thereby, a shaft mounted on said mechanism in free rotating relation thereto and adapted to be connected in driving relation to the article to be rotated, and magnetically held releasable connector means interposed between said mechanism and said shaft and drivably connecting the two to cause the latter to rotate with the former, said connector means including a magnet and a pivotally mounted lever of magnetically permeable metal a portion of which is normally held by said magnet alone in position to complete the driving connection between said magnet and said shaft, said lever extending laterally only of said magnet, said portion being automatically releasable by said magnet and movable out of said connecting position by a predetermined torque exerted thereupon whereupon the driving connection between said mechanism and said rotor ceases to exist.

7. A torque clutch for use in rotating an article, said clutch comprising a rotary power transmitter mechanism adapted to be connected to a source of rotary power, a rotor mounted coaxially on said mechanism in free rotating relation thereto and adapted to be connected to the article to be rotated, and magnetically held releasable connector means interposed between said mechanism and said rotor and drivably connecting the same to cause the latter to rotate with the former, said connector means including a magnet and a pivotally mounted lever at least a part of which is magnetically premeable and a portion of which is normally held by said magnet alone in position to engage said rotor and thereby complete the driving connection between said mechanism and said rotor, said magnet being positioned in non-encircling relation to said lever, said portion being automatically releasable by said magnet and movable out of said connecting position by a predetermined torque exerted thereupon whereupon the driving connection between said mechanism and said rotor will cease to exist.

8. A torque clutch for use in rotating an article, said clutch comprising rotary power transmitter mechanism adapted to be connected to a source of rotary power for rotation therewith, a rotor connected to said mechanism in free rotating relation thereto and adapted to be connected in driving relation to the article to be rotated, magnetically held releasable connector means interposed between said mechanism and said rotor and drivably connecting the two to cause the latter to rotate with the former, said connector means including a magnet and a pivotally mounted lever at least a part of which is made of magnetically permeable metal and a portion of which is held solely by said magnet in position to engage said rotor and complete the driving connection between said mechanism and said rotor, said magnet being arranged in non-surrounding relation to said lever, said portion being automatically releasable by said magnet and movable out of said engaging position when a predetermined torque is exerted thereupon whereupon the driving connection between said mechanism and said rotor will cease to exist, and an adjustable cam member associated with said lever for adjusting the air gap between said part of said lever and said magnet.

9. A torque clutch for use in rotating an article, said clutch comprising rotary power transmitter mechanism adapted to be connected to a source of rotary power to be rotatably driven thereby, a shaft mounted on said mechanism in freely rotating relation thereto and extending coaxially thereof, and magnetically held releasable connector means interposed between said mechanism and said shaft and drivably connecting the two to cause the latter to rotate with the former, said connector means including a magnet fixedly mounted on said mechanism and a lever pivotally mounted by a portion thereof intermediate its ends on said mechanism and having a longer lever arm at least a part of which is made of a magnetically permeable metal swingable to a position adjacent to and laterally only of said magnet and to a position outside the control of said magnet and having its other and shorter lever arm extending in position to engage said rotor in driving relation to complete the driving connection between said mechanism and said rotor, said shorter lever arm being normally held in engaging position with said rotor and being automatically releasable by said magnet and pivotable out of said connecting position when a predetermined torque is exerted thereupon whereupon the driving connection between said mechanism and said rotor will cease to exist.

10. A torque clutch for use in rotating an article, said clutch comprising a housing of non-magnetic material adapted to be connected to a source of rotary power for rotation thereby, a shaft mounted on said housing in free rotating relation thereto and extending coaxially thereof, an outwardly extending arm within said housing carried by the inner end portion of said shaft and having an abutment shoulder thereupon, a magnet mounted on said housing in fixed relation thereto, a lever pivotally mounted by a portion thereof intermediate its ends on said housing and having a longer lever arm at least a part of which is made of magnetically permeable metal swingable to a position opposite and adjacent to and laterally only of said magnet and having a shorter lever arm extending to a position where it will engage said abutment shoulder when said longer lever arm extends adjacent to said magnet whereby the driving connection between said housing and said shaft is completed, said longer lever arm being normally engaged by said magnet to hold said shorter arm in engaging position and being automatically releasable by said magnet when a predetermined torque is exerted upon said shorter lever arm whereupon said shorter lever arm may move out of said engaging position relative to said abutment shoulder and the driving connection between said housing and said shaft will cease to exist.

11. A torque clutch for use in rotating an article, said clutch comprising a housing of non-magnetic material adapted to be connected to a source of rotary power for rotation thereby, a shaft mounted upon said housing in free rotating relation and extending coaxially thereof, an outwardly extending arm carried by the inner end of said shaft within said housing and rotatable therewith and having an abutment shoulder thereupon, a fixed magnet mounted within said housing, a lever pivotally mounted upon and within said housing by one of its end portions and having a longer lever arm at least a part of which is formed of magnetically permeable meetal swingable to a position alongside said magnet in non-surrounding relation and having a shorter arm extending to a position where it will engage said abutment shoulder when said longer lever arm extends in close proximity to said magnet to complete the driving connection between said shaft and said housing, said longer lever arm being held in engaging position solely by said magnet and being automatically releasable by said magnet when a predetermined torque is exerted upon said shorter lever arm whereupon said shorter lever arm will move out of said engaging position and the driving connection between said mechanism and said rotor will cease to exist, and spacer means associated with said lever arm for adjustably regulating the air gap between said magnet and said part of said longer lever arm of said lever.

12. The structure defined in claim 11, said spacer means comprising a cam member mounted between said magnet and said lever and engaging said lever.

13. A torque clutch for use in rotating an article, said clutch comprising a housing of non-magnetic material adapted to be connected to a source of rotary power in supported relation and to be rotated thereby, a shaft mounted on said housing in free rotating relation thereto and extending coaxially thereof, an outwardly extending arm carried by the inner end of said shaft within said housing and having an abutment shoulder upon the outer end portion thereof, a magnet mounted on said housing, a lever pivotally mounted by a portion thereof intermediate its ends upon said housing and having a longer arm at least a part of which is made of magnetically permeable metal swingable to a position opposite and adjacent said magnet and having a shorter arm extending when said longer lever arm lies in close proximity to said magnet to a position in the path of said abutment shoulder to complete the driving connection between said housing and said shaft, said longer lever arm being held in non-surrounded relation and in engaging position mainly by said magnet and being automatically releasable by said magnet when a predetermined torque is exerted upon said shorter lever arm whereupon said shorter lever arm will move out of said engaging position and the driving connection between said housing and said shaft will cease to exist, the pivot for said lever being positioned outwardly from the axis of said housing so that when said longer lever arm is released by said magnet centrifugal force will maintain said lever in non-engaging position so long as said housing is rotated.

14. A torque clutch for use in rotating an article, said clutch comprising a housing of non-magnetic material adapted to be connected to a source of rotary power for rotation thereby, a shaft mounted upon said housing in free rotating relation thereto and extending coaxially thereof, an outwardly extending arm carried by the inner end of said shaft and rotating therewith within said housing and about the axis of said shaft and having a free end terminating adjacent the inner periphery of said housing, a magnet mounted upon said housing and therewithin, a lever pivotally mounted adjacent the peripheral portions of said housing and having a longer lever arm at least a part of which is formed of magnetically permeable metal swingable to a position opposite and adjacent said magnet and having a shorter lever arm extending outwardly to a position adjacent the inner periphery of said housing in position to engage said outwardly extending arm when said housing is rotated to complete the driving connection between said housing and said shaft, said longer lever arm being held in non-surrounded relation and being automatically releasable by said magnet when a predetermined torque is exerted upon said shaft and transmitted to said shorter arm and said shorter arm being simultaneously movable out of said engaging position whereupon the driving connection between said housing and said shaft will cease to exist, and means for holding said lever away from said magnet after the release of said lever so that said housing may rotate freely relative to said shaft thereafter.

15. The structure defined in claim 14, said means including a second magnet spaced from said first mentioned magnet in position to attract and hold said longer lever arm upon its release away from said first mentioned magnet and thereby hold said shorter lever arm in non-engaging position.

16. The structure defined in claim 14, and manual resetting means for causing said longer lever arm to be pivoted to a position adjacent said first mentioned magnet.

References Cited in the file of this patent
UNITED STATES PATENTS

| | | |
|---|---|---|
| 1,441,491 | Duncan et al | Jan. 9, 1923 |
| 1,960,004 | Franz | May 22, 1934 |
| 2,044,712 | Monroe | June 16, 1936 |
| 2,100,562 | Lippold | Nov. 30, 1937 |
| 2,255,211 | Gebert | Sept. 9, 1941 |
| 2,583,843 | Herrick | Jan. 29, 1952 |
| 2,631,704 | De Wiess | Mar. 17, 1953 |
| 2,741,352 | Stevens et al. | Apr. 10, 1956 |